US006489977B2

(12) United States Patent
Sone

(10) Patent No.: US 6,489,977 B2
(45) **Date of Patent: *Dec. 3, 2002**

(54) RECEIVED INFORMATION DISPLAY METHOD

(75) Inventor: Tomoshi Sone, Shizuoka (JP)

(73) Assignee: NEC Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/286,665

(22) Filed: Apr. 6, 1999

(65) Prior Publication Data

US 2002/0060700 A1 May 23, 2002

(30) Foreign Application Priority Data

Apr. 7, 1998 (JP) ........................................ 10-112698

(51) Int. Cl.[7] ........................................ G06F 3/00

(52) U.S. Cl. ..................... 345/835; 345/839; 345/810; 345/846

(58) Field of Search ............................ 345/431, 339, 345/348, 349, 352, 146, 347, 902, 764, 835, 839, 841, 846, 810, 808, 589

(56) References Cited

U.S. PATENT DOCUMENTS 5,182,553 A * 1/1993 Kung ........................ 340/7.1
5,303,388 A * 4/1994 Kreitman .................... 345/348
5,515,495 A * 5/1996 Ikemoto ..................... 345/835
5,574,843 A * 11/1996 Gerlach, Jr. ................ 345/418
5,592,605 A * 1/1997 Asuma et al. .............. 345/348
5,784,001 A * 7/1998 Deluca et al. ............. 340/7.56
6,020,828 A * 2/2000 Gotou ....................... 340/7.56
6,161,026 A * 12/2000 Uchida ...................... 455/566

FOREIGN PATENT DOCUMENTS

| | | |
|---|---|---|
| JP | 63-137316 | 6/1988 |
| JP | 6-348449 | 12/1994 |
| JP | 7-43280 | 8/1995 |
| JP | Hei 8-8815 | 1/1996 |
| JP | 8-294152 | 11/1996 |
| JP | 8-317438 | 11/1996 |
| JP | 10-23492 | 1/1998 |

* cited by examiner

*Primary Examiner*—John Cabeca
*Assistant Examiner*—Kieu D. Vu
(74) *Attorney, Agent, or Firm*—Whitham, Curtis & Christofferson, P.C.

(57) ABSTRACT

A method for displaying a combination of an icon and a message in a selective call receiver is disclosed. A notification mode is designated through a key input section. When receiving information including icon specifying information and a message, an icon corresponding to the icon specifying information is selected from a plurality of predetermined icons stored in a memory. The selected icon and the message are displayed on screen and the selected icon is displayed with designated color, designated position and/or blinking.

20 Claims, 5 Drawing Sheets

RECEIVED INFORMATION DISPLAY METHOD

BACKGROUND OF THE INVENTION

1. Field of the Invention

The present invention relates to a selective call receiver having a display section, and, more particularly, to a method of displaying reception information on the display section.

2. Description of the Related Art

In general, radio selective call receivers called pagers are desirably small and light in consideration of portability. In this respect, a liquid crystal display (LCD) cannot have a large display area. Some schemes are therefore needed to effectively transmit information to users with a limited display screen size.

For example, Japanese Utility-model Unexamined Publication (Kokai) No. 7-43280 discloses a receiver which has an icon display section capable of displaying a plurality of command icons on a display so that information is displayed in the form of icons.

Japanese Patent Unexamined Publication (Kokai) No. 8-294152 describes a multi-function pager. When detecting an incoming call in a mode other than the call standby mode, e.g., in a schedule function mode, this pager informs an incoming call by flickering or blinking an icon corresponding to the type of reception data on a part of the schedule display screen.

While the use of icons can permit effective transmission of information as mentioned above, the prior art displays an icon at a predetermined position on the display screen and thus suffers limited display information. To display an icon and character information in separate areas, a receiver needs an LCD with a larger display screen, which stands in the way of making receivers more compact and lighter.

Further, a selective call receiver with display function is described in Japanese Patent Unexamined Publication No. 8-317438. On the color LCD of the radio selective call receiver, the picture information is displayed on the full screen in a color different from the display color of the letter characters on the background.

Furthermore, a selective call receiver and its message display method are described in Japanese Patent Unexamined Publication No. 10-023492. According to the conventional message display method, a plurality of routine message icons each indicating objective information are arranged at predetermined positions on screen and one of them is selected and displayed at the corresponding position depending on the icon designation data included in a received signal.

SUMMARY OF THE INVENTION

Accordingly, it is an object of the present invention to provide a method capable of effectively displaying information in a limited display screen.

It is another object of this invention to provide a selective call receiver capable of effectively displaying plural pieces of received information in a single display screen.

It is a still another object of the present invention to provide a method and a selective call receiver which are capable of displaying received information in a user-friendly display mode.

According to the present invention, there is provided a method for displaying received information in a selective call receiver, which includes a display section, an input section, and a memory having a plurality of predetermined icons stored therein. A notification mode is designated through the input section. When receiving information including icon specifying information and display information, an icon corresponding to the icon specifying information is selected from the plurality of predetermined icons stored in the memory. The selected icon and the display information are displayed on the display section, wherein the selected icon is displayed in a designated notification mode.

The designated notification mode preferably determines a position of the selected icon and further determines a color of the selected icon which is different from that of the display information. The designated notification mode may further determine whether the selected icon blinks.

In the case where the selected icon and the display information overlap each other, the display information may be displayed in a foreground of the selected icon.

Since a selected icon is displayed on the display screen in the designated notification mode, the selected icon and the display information can easily be distinguished from each other. By designating the notification mode, the selected icon can be displayed in a user-designated mode. What is more, two kinds of information can be displayed on a single screen. This can permit information to be effectively displayed in a limited display screen.

Further, it is desirable to give the display information priority over the icon to ensure information transmission. Further, an icon may be displayed in a blinking manner. This further enhances the visual effect to help catch user's attention.

DETAILED DESCRIPTION OF THE PREFERRED EMBODIMENT

A preferred embodiment of the present invention will now be described with reference to the accompanying drawings.

Figure 1:
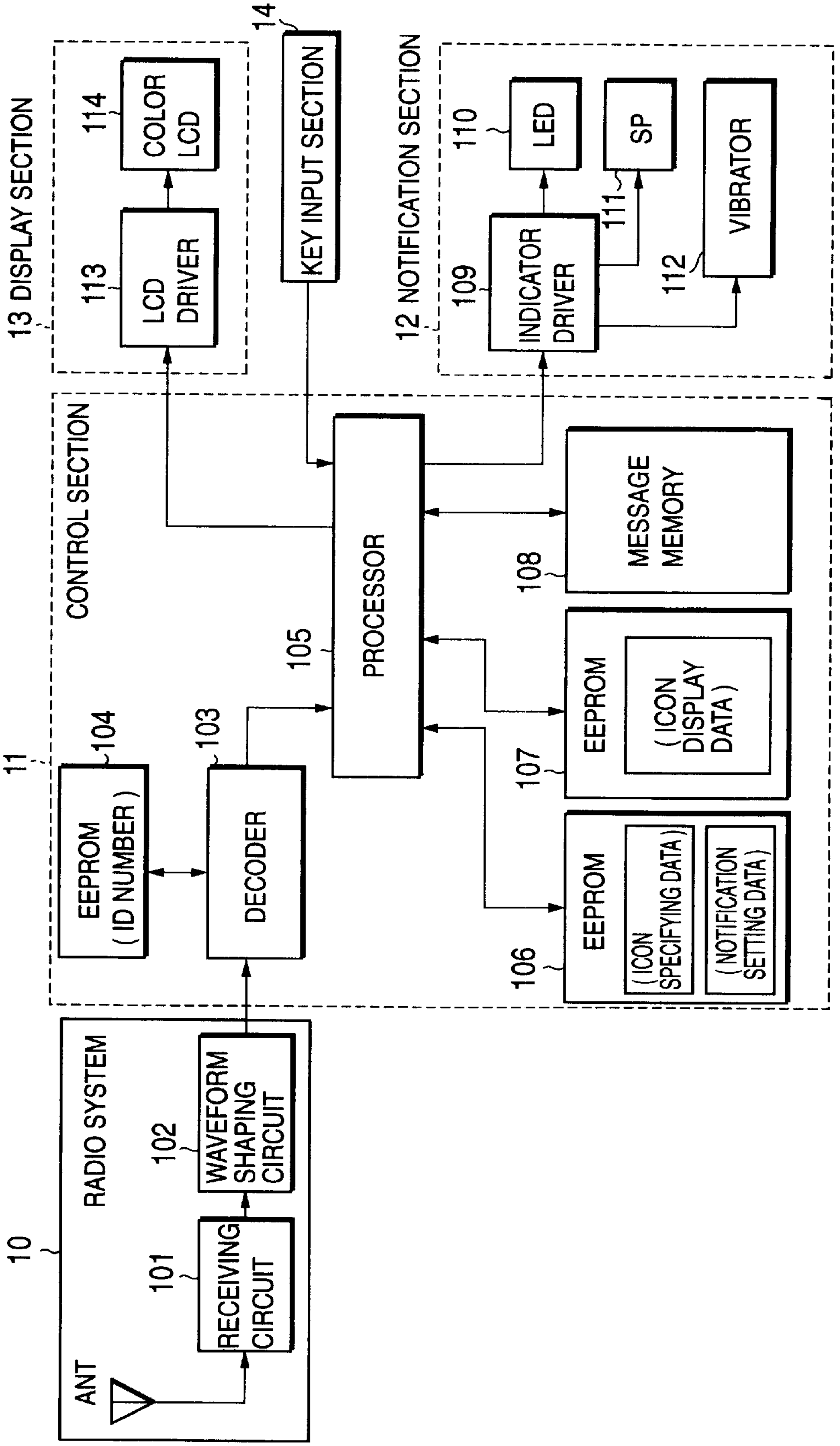
FIG. 1 is a block diagram illustrating a receiving apparatus according to one embodiment of this invention.

Referring to FIG. 1, a receiving apparatus according to the embodiment is mainly composed of a radio system 10, a control section 11, a notification section 12, a display section 13 and a key input section 14. The radio system 10 includes a receiving circuit 101 connected to an antenna and a waveform shaping circuit 102. The receiving circuit 101 demodulates a radio signal received through the antenna, yielding a baseband signal which undergoes waveform shaping in the waveform shaping circuit 102. The waveform-shaped signal is sent as received data to the control section 11.

The control section 11 includes a decoder 103, an identification (ID) number memory 104 and a processor 105. The decoder 103 decodes the received data from the radio section 10, and compares a calling number included in the received data with an ID number stored in the ID number memory 104. When the received calling number matches the ID number, the decoder 103 determines that the receiving apparatus has received a message addressed to itself, and sends message data following the calling number to the processor 105.

Connected to the processor 105 are a memory 106 where icon specifying data and notification setting data are stored, a memory 107 where icon display data is stored, and a message memory 108 for storing a received message. A memory (not shown) where display data of ordinary message characters are stored is also connected to the processor 105. A read only memory (not shown) in which a reception control program is stored is also connected to the processor 105, so that as the processor 105 reads out and runs the reception control program, various functions including a message display control to be discussed later are accomplished.

The notification section 12 includes an indicator driver 109, a light-emitting diode (LED) 110, a speaker 111, and a vibrator 112, the latter three connected to the indicator driver 109. Under the control of the processor 105 of the control section 11, the indicator driver 109 drives the light-emitting diode 110, the speaker 111 and/or the vibrator 112 to inform a user of an incoming call in the form of light, sound and/or vibration.

The display section 13 includes an LCD driver 113 and a color LCD 114, and displays a received message under the control of the processor 105. The key input section 14 is a key pad provided on the receiving apparatus, and is used to input various commands and notification setting data to be discussed later.

The memories 104, 106 and 107 should desirably be constituted of an electrically erasable programmable read only memory (EEPROM). For example, memory areas equivalent to the memories 104, 106 and 107 may be provided in a single EEPROM so that icon specifying data, notification setting data and icon display data can be stored in the respective memory areas.

Figure 2:
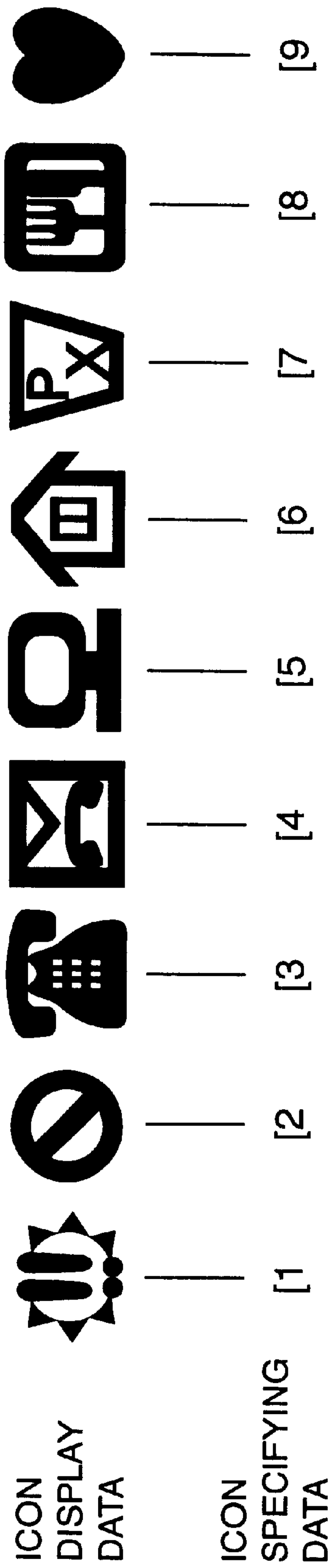
FIG. 2 is an exemplary diagram showing a correlation between the types of icons and icon specifying data both used in this embodiment.

In FIG. 2 showing a correlation between the types of icons and icon specifying data, while the actual meanings of icons may vary depending on individuals, groups, towns or countries, icons which permit users to express their minimum intentions should be set.

In the example shown in FIG. 2, people would generally think that icons corresponding to icon specifying data "[1", "[3" and "[4" respectively mean "urgent," "phone me" and "voice mail. " The processor 105 can detect icon specifying data from the received message by referring to the icon specifying data in the memory 106. When detecting one icon specifying data, the processor 105 reads the associated icon display data from the memory 107 and displays it on the color LCD 114 according to the notification setting data.

Figure 3:
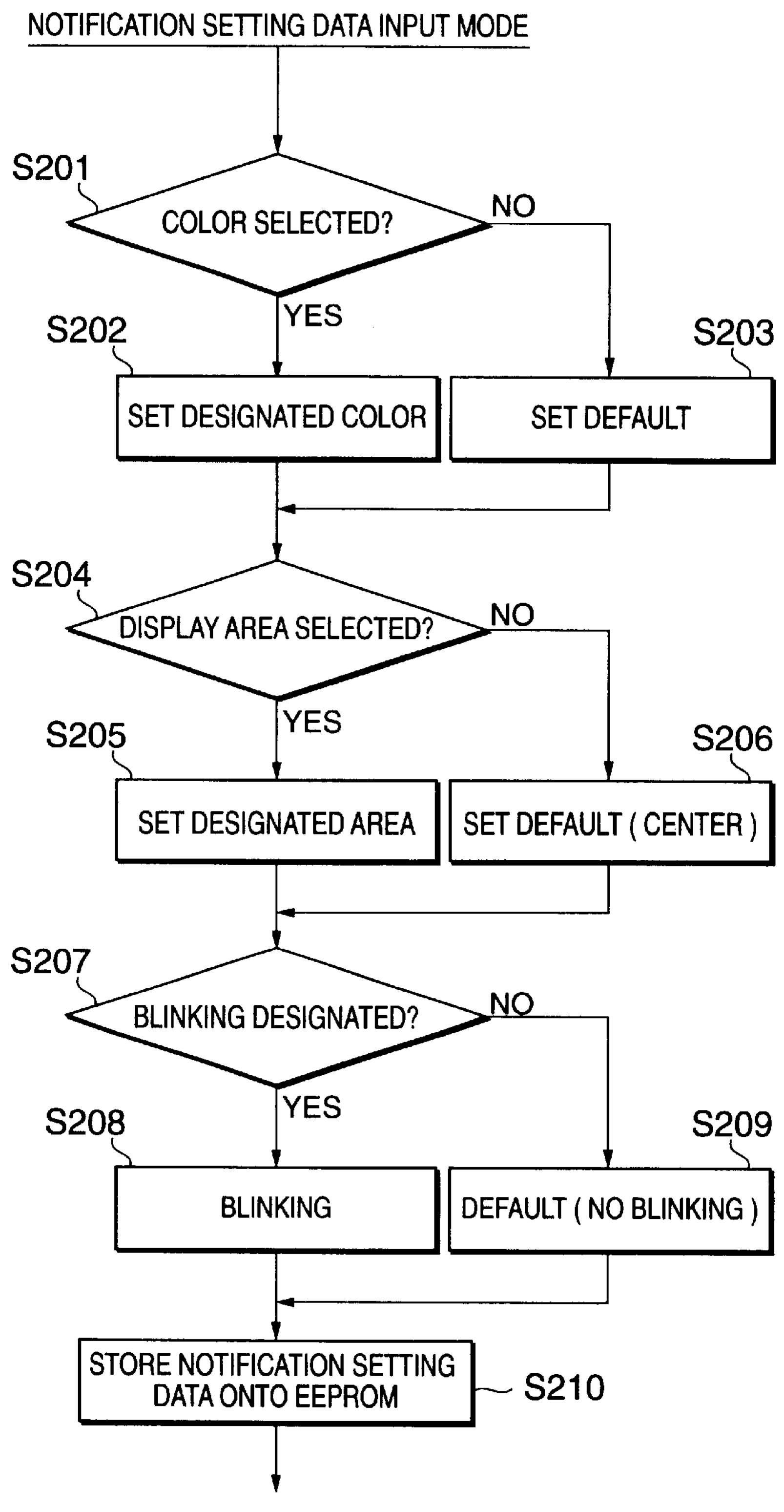
FIG. 3 is a flowchart illustrating procedures of inputting notification setting data.

Referring to FIG. 3, notification setting data determines a mode at the time of displaying an icon. The user operates the key input section 14 to set a notification setting data input mode, and selects items one after another in accordance with a menu.

First, the screen of the color LCD 114 changes to a color selection screen (S201). When a color is selected, the designated color is set (S202). When no color selection is made, the default color is set (S203). It is to be however noted that because message characters are displayed in black in this embodiment, it is desirable to select other colors than black for the display color for an icon.

Then, the display screen changes to a display area selection screen (S204). When a display area is selected, the designated area is set (S205). When no selection is made, the default area ("center" in this example) is set (S206). There are various ways of designating the display area. For example, a position (right, center or left) may be designated in the display screen, or the full screen may be designated as the display area In the subsequent blinking designation screen (S207), when blinking is selected, a blinking mode is set (S208), whereas when no blinking is selected, a no-blinking mode is set (S209). While the blinking designation step can be omitted, it is effective to designate blinking to attract the user's attention.

When the color, display position and whether or not to use the blinking display are set in the above-described manner, the notification setting data is stored in the memory 106 (S210). In accordance with this notification setting data, the icon is displayed in color. Though not illustrated, for a portion where the icon and display message overlap each other, the display message is given priority over the icon.

Figure 4:
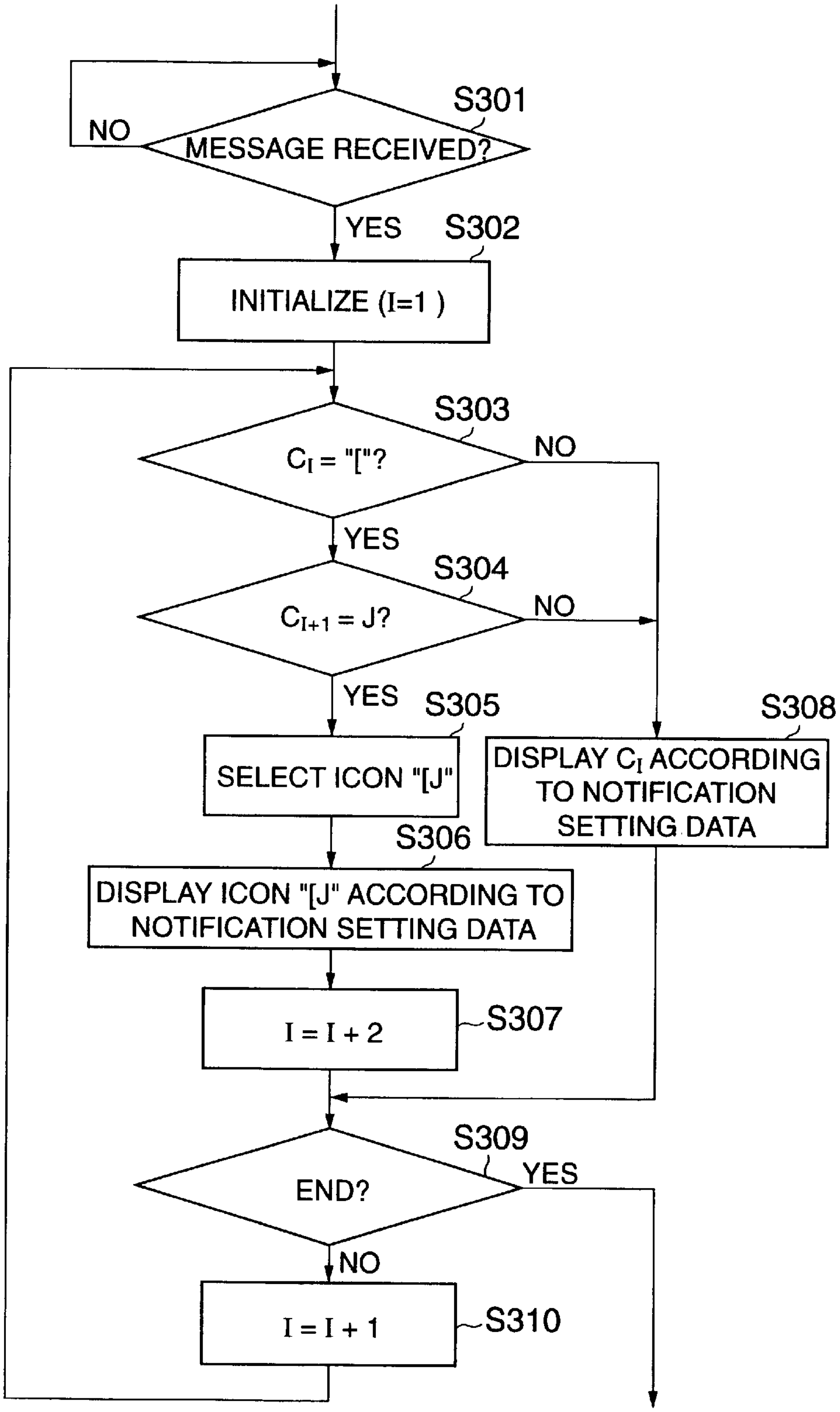
FIG. 4 is a flowchart illustrating a method of displaying a received message according to one embodiment of this invention.

Referring to FIG. 4, when receiving a message from the decoder 103 (YES in S301), the processor 105 stores the received message in the message memory 108 and initializes a variable I (S302).

The processor 105 then reads the I-th character $C_I$ in the received message from the message memory 108 and reads an icon specifying character "[" from the memory 106, and determines if the character $C_I$ matches "[" (S303).

When $C_I$ matches "[" (YES in S303), the processor 105 reads the (I+1)-th character $C_{I+1}$ in the received message from the message memory 108 and determines if it matches a value J (any one of "1" to "9" in the example in FIG. 2) which specifies one of the registered icons (S304). In other words, through steps S303 and S304, it is determined whether or not icon specifying data is included in the received message.

When the character $C_{I+1}$ matches one of the values 1 to 9 (YES in S304), icon display data corresponding to the icon specifying data "[J" is selected from the data in the memory 107 (S305). When J=4, for example, an icon which implies a voice mail is selected.

The selected icon display data is sent to the display section 13, and is displayed on the color LCD 114 in accordance with the notification setting data (S306). If "red" is selected and "center" is selected as the display area, for example, the selected icon is displayed in red in the center of the display screen. If "blinking display" is selected, the red icon blinks in a given period. Subsequently, the variable I is incremented by "2" to skip the icon specifying data by two characters (S307).

When the character $C_I$ does not coincide with "[" (NO in S303) or the character $C_{I+1}$ does not coincide with any one of the values 1 to 9 (NO in S304), it is determined that the character $C_I$ is an ordinary message character, not an icon specifying code, and the character $C_I$ is displayed on the color LCD 114 in accordance with the notification setting data (S308). With regard to a portion where both data overlap each other, because a message character has priority over an icon, the message character is displayed in the foreground.

After step S307 or S308, it is determined if the last character in the received message has been reached (S309).

If some characters still remain in the received message (NO in S309), the variable I is incremented by "1" (S310) after which the flow returns to step S303. The sequence of steps S303 to S310 is repeated until the last character in the received message is reached.

Figure 5:
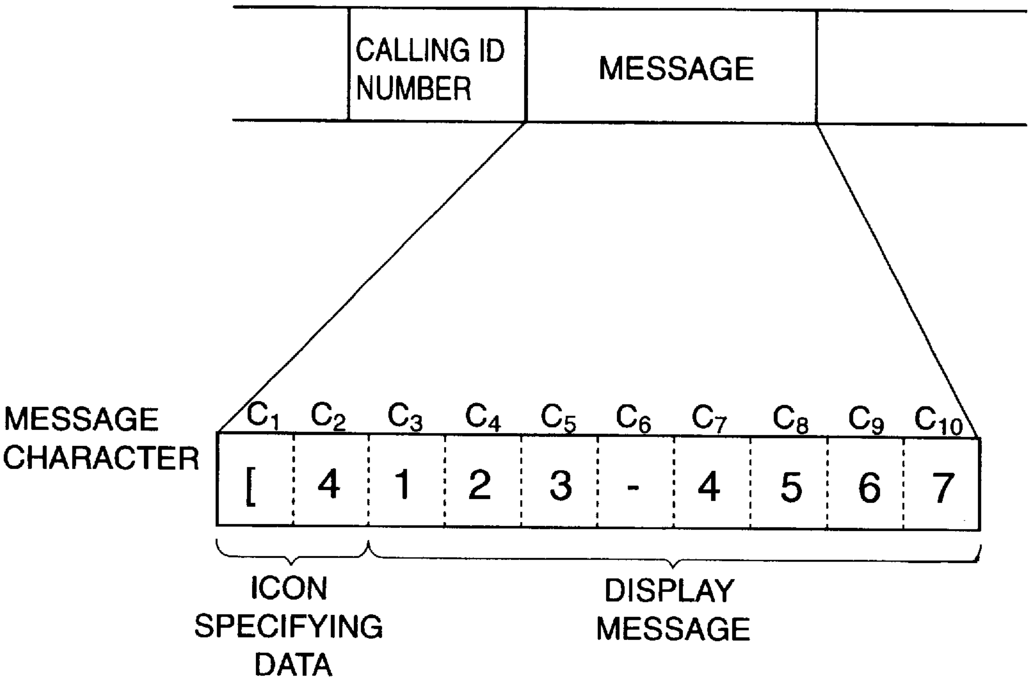
FIG. 5 is a diagram exemplifying a selective paging signal to be received by a selective radio paging receiver according to this invention.
Figure 6:
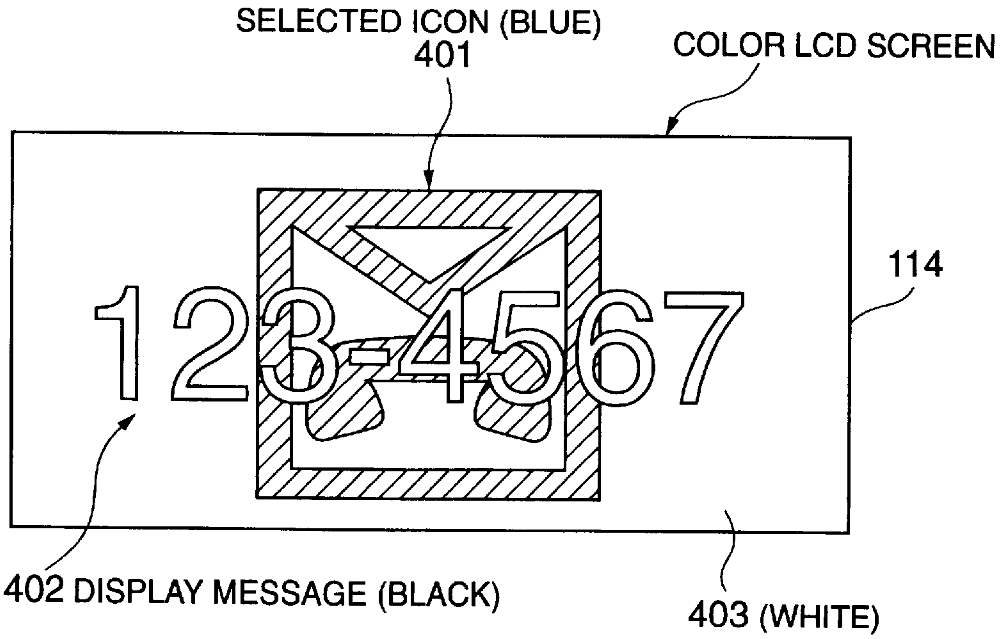
FIG. 6 is a diagram showing a display example when the selective paging signal shown in FIG. 5 is received.

FIG. 5 exemplifies a selective paging signal to be received by the selective radio paging receiver according to this invention, and FIG. 6 shows a display example for that case.

When a calling ID number is addressed to the receiver, a message following that ID number is received as shown in FIG. 25. As mentioned earlier, when icon specifying data ("[4" in this example) is found, the processor 105 reads the corresponding icon display data from the memory 107 and displays it on the color LCD 114. The subsequent display message character ("123-4567" in this example) is displayed over the icon. The notification setting data of an icon (i.e., the color, display position or whether or not to use blinking display) should be set previously as illustrated in FIG. 3.

When the display color of the icon has been set to "blue," the display position has been set to "center" and the display color of the message character has been set to "black," an icon 401 indicative of "voice mail" is displayed in blue in the center of the screen, with a display message character 402 ("123-4567") displayed over the icon 401 in black. The other area 403 is displayed in white.

For the portion where the icon 401 and the display data message 402 overlap each other, the display message 402 is displayed in full screen by priority, so that necessary information can be transmitted reliably.

According to this invention, as apparent from the above, as an icon and display information are displayed on the display screen of the display section in different modes, the two types of information can not only be easily distinguished from each other but can also be displayed on a single screen. This can allow information to be surely transmitted even using a small display screen such as the one provided on a portable receiver or the like.

Further, the notification setting data of an icon (i.e., the color, display position or whether or not to use blinking display) is set previously as shown in FIG. 3. Therefore, a specified icon can be displayed in a user-specified mode, resulting in user-friendly displaying.

Although only one embodiment of the present invention has been described herein, it should be apparent to those skilled in the art that the present invention may be embodied in many other specific forms without departing from the spirit or scope of the invention. Therefore, the present example and embodiment are to be considered as illustrative and not restrictive and the invention is not to be limited to the details given herein, but may be modified within the scope of the appended claims.

What is claimed is:

1. A method for displaying received information in a selective call receiver, which includes a display section, an input section, and a memory having a plurality of predetermined icons stored therein, the method comprising the steps of:

a) designating a user-specified notification mode for display of the plurality of predetermined icons through the input section;

b) receiving information including icon specifying information and display information;

c) selecting an icon corresponding to the icon specifying information from the plurality of predetermined icons stored in the memory; and d) displaying a selected icon and the display information on the display section, wherein the selected icon is displayed in a designated notification mode.

2. The method according to claim 1, wherein the designated notification mode determines a position of the selected icon.

3. The method according to claim 2, wherein the designated notification mode further determines a color of the selected icon which is different from that of the display information.

4. The method according to claim 3, wherein the designated notification mode further determines whether the selected icon blinks.

5. The method according to claim 2, wherein the designating step includes the display information overlapping the selected icon such that the display information is displayed in a foreground of the selected icon.

6. The method according to claim 1, wherein the step a), the notification mode is menu-selectable.

7. A selective call receiver for receiving information including icon specifying information and display information, comprising:

an input device;

a display device;

a memory having a plurality of predetermined icons stored therein; and a processor for designating a user-specified notification mode for display of the plurality of predetermined icons through the input device, selecting an icon corresponding to the icon specifying information from the plurality of predetermined icons stored in the memory, and displaying a selected icon and the display information on the display device, wherein the selected icon is displayed in the designated notification mode.

8. The selective call receiver according to claim 7, wherein the designated notification mode determines a position of the selected icon.

9. The selective call receiver according to claim 8, wherein the designated notification mode further determines a color of the selected icon which is different from that of the display information.

10. The selective call receiver according to claim 9, wherein the designated notification mode further determines whether the selected icon blinks.

11. The selective call receiver according to claim 8, wherein the processor further designates the display information to overlap the selected icon such that the display information is displayed in a foreground of the selected icon.

12. A method for displaying received information in a selective call receiver, said selective call receiver including a display section, an input section and a memory section having data representing a plurality of predetermined icons stored therein, said method comprising steps of:

storing notification mode setting data which is input by a user from said input section into said memory section to designate a user-specified notification mode for display of respective ones of said plurality of icons;

receiving message data information including at least one of icon specifying information and display information;

reading data for a selected one of said predetermined icons and corresponding notification setting data from said memory in response to said icon specifying data; and displaying said data for a selected one of said plurality of predetermined icons in accordance with said notification setting data.

13. A method as recited in claim 12, wherein said storing step includes input of information selected from a menu.

14. A method as recited in claim 12, wherein said notification setting data includes icon position data for controlling a location where an icon is displayed on a display of said display section.

15. A method as recited in claim 12, wherein said notification setting data includes color information for controlling a color in which an icon is displayed on a display of said display section.

16. A method as recited in claim 12, wherein said notification setting data includes blinking information for controlling blinking of a display of said icon on a display of said display section.

17. A method as recited in claim 12, including further step of displaying said display information received in said receiving step.

18. A method as recited in claim 17, wherein said display information is displayed in a foreground overlapping said display of said icon.

19. A method as recited in claim 12, wherein said storing step includes storing of default notification setting data.

20. A method as recited in claim 12, wherein said receiving step includes a step of determining whether or not icon specifying data is in said message data.

* * * * *